(12) United States Patent
Matsui et al.

(10) Patent No.: US 11,325,853 B2
(45) Date of Patent: May 10, 2022

(54) SEWAGE TREATMENT SYSTEM

(71) Applicant: KYOGYOKU ENGINEERING CO., LTD., Tokushima (JP)

(72) Inventors: Saburou Matsui, Kyoto (JP); Takafumi Sugihara, Kyoto (JP)

(73) Assignee: KYOGYOKU ENGINEERING CO., LTD, Tokushima (JP)

( * ) Notice: Subject to any disclaimer, the term of this patent is extended or adjusted under 35 U.S.C. 154(b) by 242 days.

(21) Appl. No.: 16/663,473

(22) Filed: Oct. 25, 2019

(65) Prior Publication Data

US 2020/0140308 A1    May 7, 2020

(30) Foreign Application Priority Data

Nov. 7, 2018 (JP) .............................. JP2018209391
Dec. 17, 2018 (JP) .............................. JP2018235072
(Continued)

(51) Int. Cl.
*C02F 11/02* (2006.01)
*C02F 9/00* (2006.01)
(Continued)

(52) U.S. Cl.
CPC .............. *C02F 11/02* (2013.01); *C02F 9/00* (2013.01); *C02F 11/121* (2013.01);
(Continued)

(58) Field of Classification Search
CPC ...... C02F 3/1221; C02F 3/1236; C02F 3/341; C02F 3/348; C02F 11/02; C02F 11/12;
(Continued)

(56) References Cited

U.S. PATENT DOCUMENTS

| 4,159,944 | A  | * | 7/1979 | Erickson | ............... C02F 11/004 210/611 |
| 6,770,198 | B2 | * | 8/2004 | Newton | .................... C02F 3/10 210/601 |
| 2020/0031698 | A1 | * | 1/2020 | Naider-Fanfan | ........ C02F 3/341 |

FOREIGN PATENT DOCUMENTS

| JP | H05015891 A | 1/1993 |
| JP | H06238295 A | 8/1994 |

(Continued)

*Primary Examiner* — Nam X Nguyen
*Assistant Examiner* — Julia L. Wun
(74) *Attorney, Agent, or Firm* — Renner, Kenner, Greive, Bobak, Taylor & Weber (57) ABSTRACT

A sewage treatment system includes dehydration means to dehydrate the received surplus sludge and/or the received return sludge; a microbial material production device configured to supply oxygen to the dehydrated sludge received from the dehydration means while maintaining the temperature of the dehydrated sludge to subject the dehydrated sludge to aerobic fermentation, thereby producing a microbial material; water feeding means configured to feed water from any part of the sewage treatment system to the aftermentioned microbe activation device; a microbe activation device configured to receive the microbial material from the microbial material production device, and supply the water from the water feeding means to the received microbial material; and oxygen supply means configured to supply oxygen to the sewage at any position of the relay pump station; wherein the sewage is sent from the relay pump station to the sewage treatment facility.

12 Claims, 2 Drawing Sheets

(30) Foreign Application Priority Data

Aug. 16, 2019 (JP) .............................. JP2019149266
Aug. 16, 2019 (JP) .............................. JP2019149267

(51) Int. Cl.
*C02F 11/121* (2019.01)
*C02F 3/12* (2006.01)
*C02F 3/34* (2006.01)
*C02F 1/00* (2006.01)

(52) U.S. Cl.
CPC .......... *C02F 3/1221* (2013.01); *C02F 3/1236* (2013.01); *C02F 3/341* (2013.01); *C02F 2001/007* (2013.01); *C02F 2303/04* (2013.01); *C02F 2305/06* (2013.01)

(58) Field of Classification Search
CPC C02F 11/121; C02F 2303/04; C02F 2303/08; C02F 2001/007; C02F 2305/06; C02F 2307/08; C02F 9/00; Y02W 10/20; Y02W 10/10
USPC ...................................... 210/195.3, 609, 620
See application file for complete search history.

(56) References Cited

FOREIGN PATENT DOCUMENTS

| | | | |
|---|---|---|---|
| JP | 2003053375 A | | 2/2003 |
| JP | 2004261694 A | | 9/2004 |
| JP | 2004344886 A | * | 12/2004 |
| JP | 2006231211 A | | 9/2006 |
| JP | 2006247493 A | | 9/2006 |
| JP | 2017192934 A | | 10/2017 |

* cited by examiner

SEWAGE TREATMENT SYSTEM

TECHNICAL FIELD

The present invention relates to a sewage treatment system, and more specifically to a sewage treatment system comprising: a relay pump station for sewage discharged from a sewage source including homes and/or industrial plants/companies; and a sewage treatment facility configured to receive the sewage from the relay pump station via a sewer conduit and treat the received sewage, wherein the sewage treatment facility comprises an initial sedimentation pond, a biological treatment vessel and a final sedimentation pond, which are arranged in this order along an upstream-to-downstream direction.

The sewage treatment system of the present invention makes it possible to, e.g., prevent degradation of the sewer conduit downstream of the relay pump station.

BACKGROUND ART

As a method of treating a treatment target liquid such as drainage or sewage, activated sludge treatment for treating the treatment target liquid by means of activated sludge has been widely conducted.

For example, as widely disclosed in JP 2013-233482A and others, a wastewater treatment system using an activated sludge method basically comprises an initial sedimentation pond (which can be omitted in a small-scale sewage treatment system), a reaction vessel, and a final sedimentation pond. The wastewater treatment system is operable, according to activated sludge method, to: in the initial sedimentation pond separate, separate crude sludge from wastewater supplied thereto; in the reaction vessel, dissolve oxygen in the resulting wastewater supplied thereto via a flow passage, by means of aeration, and simultaneously cause activated sludge mainly comprised of aerobic microbes (microorganisms) to be suspended in the wastewater with oxygen by means of stirring/mixing; then, in the final sedimentation pond, precipitate the activated sludge supplied thereto via a flow passage; and discharge supernatant water as final effluent from the final sedimentation pond. The reaction vessel is also sometimes referred to as "aeration vessel", "reaction tank", "aeration tank" or "biological treatment vessel", and an aeration time period is in the range of 6 to 14 hours. A part of the activated sludge precipitated in the final sedimentation pond is returned as return sludge to the reaction vessel again, and the remaining activated sludge is condensed as surplus sludge in a mechanical condensing facility.

Although a part of the activated sludge precipitated in the final sedimentation pond is effectively used in the above manner, the technical idea of this Patent Document does not go beyond the scope of this teaching.

Meanwhile, sewage discharged from a sewage source including homes and/or industrial plants/companies flows into a sewer conduit from moment to moment. In this process, human intestinal bacteria and/or microbes (mainly bacteria) from industrial plants flow into the sewer conduit together with the sewage. Generally, during the course of flowing down through the sewer conduit, the sewage is likely to become an oxygen-free state, because, although the sewage takes in oxygen from the air, the microbes consume oxygen more than the taken-in oxygen. As a result, the activity of sulfate-reducing bacteria as anaerobic bacteria becomes active, so that the sulfate-reducing bacteria decompose organic substances using sulfate to generate hydrogen sulfide gas. The generated hydrogen sulfide gas is a cause of bad smell from sewage, and is toxic gas which is dangerous when a worker enters a sewer system through a manhole. Besides, if the hydrogen sulfide gas is dissolved in a water film existing on an upper region of a wall defining an internal space of the sewer conduit, sulfuric acid-producing bacteria are proliferated, so that sulfuric acid is produced to corrode a cement wall of the sewer conduit, resulting in degradation/breakup of the concrete pipe (sewer conduit). An extension of usable life of the concrete pipe as the basis of a sewer system is a significantly important problem in terms of maintenance of urban infrastructures.

In order to solve such a problem, JP H03-055199B proposes a system in which an oxygenation (oxygen-adding) device is provided at a midway position of a sewer conduit and configured to introduce therein sludge in sewage flowing down through the sewer conduit, and after adding oxygen into the sludge, return the resulting sludge to the sewage flowing down through the sewer conduit again, thereby maintaining a positive dissolved oxygen concentration of the sewage.

Although it is true that the system described in this Patent Document is capable of maintaining a positive dissolved oxygen concentration of the sewage in the sewer conduit, the technical idea thereof does not go beyond the scope of this teaching.

SUMMARY OF INVENTION

It is therefore an object of the present invention to advance one more step, i.e., provide a sewage treatment system capable of maintaining a positive dissolved oxygen concentration of sewage flowing down through a sewer conduit downstream of a relay pump station, and changing a microbial state on an inner wall of the sewer conduit to prevent corrosion of the sewer conduit.

It is another object of the present invention to provide a sewage treatment system comprising a microbial material production device for treating activated sludge to produce a microbial material capable of further effectively acting in a biological treatment vessel.

The above objects can be achieved by a sewage treatment system of the present invention having features described in the following sections (1) to (33).

(1) A sewage treatment system comprising: a relay pump station for sewage discharged from a sewage source including homes and/or industrial plants/companies; a sewage treatment facility configured to receive the sewage from the relay pump station via a sewer conduit and treat the received sewage, wherein the sewage treatment facility comprises an initial sedimentation pond, a biological treatment vessel and a final sedimentation pond, which are arranged in this order along an upstream-to-downstream direction; dehydration means connected to the initial sedimentation pond and/or the final sedimentation pond and configured to receive surplus sludge from the initial sedimentation pond and/or return sludge from the final sedimentation pond and dehydrate the received surplus sludge and/or the received return sludge; a microbial material production device configured to supply oxygen to the dehydrated sludge received from the dehydration means while maintaining a temperature of the dehydrated sludge within the range of 60° C. to 110° C., to subject the dehydrated sludge to aerobic fermentation using Gram-positive aerobic microbes in the dehydrated sludge, thereby producing a microbial material in which Gram-negative anaerobic and facultative anaerobic microbes in the dehydrated sludge are decomposed and extinguished and which contains aerobic microbial endospores or spores produced after the aerobic fermentation; water feeding means configured to feed water from any part of the sewage treatment system to the after-mentioned microbe activation device; a microbe activation device configured to receive the microbial material from the microbial material production device, and supply the water from the water feeding means to the received microbial material, while maintaining a temperature and an oxygen concentration of the water, respectively, within the range of 10° C. to 40° C., and within the range of 1 to 10 mg/L, thereby germinating the spores of the microbial material to activate the microbial material; and oxygen supply means, which is understood to be an oxygen supply source configured to supply oxygen to the sewage at any position of the relay pump station; wherein the sewage including the activated microbial material and the oxygen supplied from the oxygen supply means is sent from the relay pump station to the sewage treatment facility.

(2) The sewage treatment system as described in the section (1), wherein a temperature of the water from the water feeding means is maintained within the range of 15° C. to 40° C.

(3) The sewage treatment system as described in the section (1) or (2), wherein the water from the water feeding means is water treated by the sewage treatment facility.

(4) The sewage treatment system as described in the section (3), wherein the sewage treatment facility further comprises a disinfection vessel configured to disinfect water from the final sedimentation pond, and wherein the water from the water feeding means is water in the disinfection vessel before the disinfection.

(5) The sewage treatment system as described in the section (1), wherein the water from the water feeding means is sewage upstream of a pump of the relay pump station.

(6) The sewage treatment system as described in any one of the sections (1) to (5), wherein the oxygen supply means is configured to supply oxygen to the sewage in a pump of the relay pump station.

(7) The sewage treatment system as described in any one of the sections (1) to (6), wherein the water from the water feeding means contains nutrients required for germination of the spores.

(8) The sewage treatment system as described in any one of the sections (1) to (7), wherein the aerobic microbes include at least one selected from the group consisting of: Gram-positive bacteria belonging to the class Bacilli in the phylum Firmicutes; Gram-positive bacteria belonging to the class Actinobacteria in the phylum Actinobacteria; and Gram-positive bacteria in the phylum Chloroflexi, and optionally include yeasts.

(9) The sewage treatment system as described in any one of the sections (1) to (8), wherein the anaerobic and facultative anaerobic microbes includes gut-dwelling Gram-negative sulfate-reducing bacteria in the phylum Proteobacteria, and/or are Gram-negative bacteria in the phylum Bacteroidetes.

(10) A sewage treatment system comprising: a relay pump station for sewage discharged from a sewage source including homes and/or industrial plants/companies; a sewage treatment facility configured to receive the sewage from the relay pump station via a sewer conduit and treat the received sewage, wherein the sewage treatment facility comprises a biological treatment vessel and a final sedimentation pond which are arranged in this order along an upstream-to-downstream direction, and optionally further comprises an initial sedimentation pond disposed upstream of the biological treatment vessel; dehydration means connected to the final sedimentation pond and optionally the initial sedimentation pond, and configured to receive return sludge from the final sedimentation pond and optionally surplus sludge from the initial sedimentation pond, and dehydrate the received return sludge and optionally the received surplus sludge; a microbial material production device configured to supply oxygen to the dehydrated sludge received from the dehydration means while maintaining a temperature of the dehydrated sludge within the range of 60° C. to 110° C., to subject the dehydrated sludge to aerobic fermentation using Gram-positive aerobic microbes in the hydrated sludge, thereby producing a microbial material in which Gram-negative anaerobic and facultative anaerobic microbes are decomposed and extinguished and which contains aerobic microbial endospores or spores produced after the aerobic fermentation; first water feeding means configured to feed water from any part of the sewage treatment system to the after-mentioned first microbe activation device; first oxygen supply means configured to supply oxygen to the after-mentioned first microbe activation device; a first microbe activation device configured to: receive the microbial material from the microbial material production device; receive supply of the oxygen from the first oxygen supply means and supply of the water from the first water feeding means, while maintaining a temperature and an oxygen concentration of the water, respectively, within the range of 10° C. to 40° C., and within the range of 1 to 10 mg/L, thereby germinating the spores of the microbial material to activate the microbial material; and supply the activated microbial material to the biological treatment vessel; second water feeding means configured to feed water from any part of the sewage treatment system to the after-mentioned second microbe activation device; second oxygen supply means configured to supply oxygen to the after-mentioned second microbe activation device; a second microbe activation device configured to: receive the microbial material from the microbial material production device; receive supply of the oxygen from the second oxygen supply means and supply of the water from the second water feeding means, while maintaining a temperature and an oxygen concentration of the water, respectively, within the range of 10° C. to 40° C., and within the range of 1 to 10 mg/L, thereby germinating the spores of the microbial material to activate the microbial material; and supply the activated microbial material to the relay pump station.

(11) The sewage treatment system as described in the section (1), wherein a temperature of the water from the first and second water feeding means is maintained within the range of 15° C. to 40° C.

(12) The sewage treatment system as described in the section (11) or (12), wherein the oxygen from the first and second oxygen supply means is supplied in the form of air.

(13) The sewage treatment system as described in any one of the section (10) to (12), wherein the sewage treatment facility comprises the initial sedimentation pond, and wherein the water to be supplied to the first and second microbe activation device is overflow from the initial sedimentation pond.

(14) The sewage treatment system as described in any one of the sections (10) to (12), wherein the sewage treatment facility comprises the initial sedimentation pond, and wherein the water to be supplied to the first and second microbe activation device is the sewage before entering the initial sedimentation pond.

(15) The sewage treatment system as described in any one of the sections (10) to (12), wherein the water to be supplied to the first and second microbe activation device is water treated by the sewage treatment facility.

(16) The sewage treatment system as described in the section (15), wherein the sewage treatment facility further comprises a disinfection vessel configured to disinfect water from the final sedimentation pond, and wherein the water to be supplied to the first and second microbe activation device is water in the disinfection vessel before the disinfection.

(17) The sewage treatment system as described in any one of the sections (13) to (16), wherein the water from the first and second water feeding means contains nutrients required for germination of the spores.

(18) The sewage treatment system as described in any one of the sections (10) to (17), wherein the aerobic microbes include at least one selected from the group consisting of: Gram-positive bacteria belonging to the class Bacilli in the phylum Firmicutes; Gram-positive bacteria belonging to the class Actinobacteria in the phylum Actinobacteria; and Gram-positive bacteria in the phylum Chloroflexi, and optionally include yeasts.

(19) The sewage treatment system as described in any one of the sections (10) to (18), wherein the anaerobic and facultative anaerobic microbes include gut-dwelling Gram-negative sulfate-reducing bacteria in the phylum Proteobacteria, and/or are Gram-negative bacteria in the phylum Bacteroidetes.

(20) A sewage treatment system comprising: a relay pump station for sewage discharged from a sewage source including homes and/or industrial plants/companies; a sewage treatment facility configured to receive the sewage from the relay pump station via a sewer conduit and treat the received sewage, wherein the sewage treatment facility comprises a biological treatment vessel and a final sedimentation pond which are arranged in this order along an upstream-to-downstream direction, and optionally further comprises an initial sedimentation pond disposed upstream of the biological treatment vessel; dehydration means connected to the final sedimentation pond and optionally the initial sedimentation pond, and configured to receive return sludge from the final sedimentation pond and optionally surplus sludge from the initial sedimentation pond, and dehydrate the received return sludge and optionally the received surplus sludge; a microbial material production device configured to supply oxygen to the dehydrated sludge received from the dehydration means while maintaining a temperature of the dehydrated sludge within the range of 60° C. to 110° C., to subject the dehydrated sludge to aerobic fermentation using Gram-positive aerobic microbes in the hydrated sludge, thereby producing a microbial material in which Gram-negative anaerobic and facultative anaerobic microbes are decomposed and extinguished and which contains aerobic microbial endospores or spores produced after the aerobic fermentation; first water feeding means configured to feed water from any part of the sewage treatment system to the after-mentioned first microbe activation device; first oxygen supply means configured to supply oxygen to the after-mentioned first microbe activation device; a first microbe activation device configured to: receive the microbial material from the microbial material production device; receive supply of the oxygen from the first oxygen supply means and supply of the water from the first water feeding means, while maintaining a temperature and an oxygen concentration of the water, respectively, within the range of 10° C. to 40° C., and within the range of 1 to 10 mg/L, thereby germinating the spores of the microbial material to activate the microbial material; and supply the activated microbial material to the biological treatment vessel; second water feeding means configured to feed water from any part of the sewage treatment system to the after-mentioned second microbe activation device; second oxygen supply means configured to supply oxygen to the after-mentioned second microbe activation device; a second microbe activation device configured to: receive the microbial material from the microbial material production device; supply the water from the second water feeding means to the microbial material while maintaining a temperature and an oxygen concentration of the water, respectively, within the range of 10° C. to 40° C., and within the range of 1 to 10 mg/L, thereby germinating the spores of the microbial material to activate the microbial material; and supply the activated microbial material to the relay pump station.

(21) The sewage treatment system as described in the section 20, wherein a temperature of the water from the first and second water feeding means is maintained within the range of 15° C. to 40° C.

(22) The sewage treatment system as described in the section (20) or (21), wherein the oxygen from the first and second oxygen supply means is supplied in the form of air.

(23) The sewage treatment system as described in any one of the sections (20) to (22), wherein the sewage treatment facility comprises the initial sedimentation pond, and wherein the water to be supplied to the first and second microbe activation device is overflow from the initial sedimentation pond.

(24) The sewage treatment system as described in any one of the sections (20) to (22), wherein the sewage treatment facility comprises the initial sedimentation pond, and wherein the water to be supplied to the first and second microbe activation device is the sewage before entering the initial sedimentation pond.

(25) The sewage treatment system as described in any one of the sections (20) to (22), wherein the water to be supplied to the first and second microbe activation device is water treated by the sewage treatment facility.

(26) The sewage treatment system as described in the section 25, wherein the sewage treatment facility further comprises a disinfection vessel configured to disinfect water from the final sedimentation pond, and wherein the water to be supplied to the first and second microbe activation device is water in the disinfection vessel before the disinfection.

(27) The sewage treatment system as described in any one of the sections (21) to (26), wherein the sewage treatment facility comprises the initial sedimentation pond, and wherein the water to be supplied to the first and second microbe activation device is overflow from the initial sedimentation pond.

(28) The sewage treatment system as described in any one of the sections (21) to (26), wherein the sewage treatment facility comprises the initial sedimentation pond, and wherein the water to be supplied to the first and second microbe activation device is the sewage before entering the initial sedimentation pond.

(29) The sewage treatment system as described in any one of the sections (21) to (26), wherein the water to be supplied to the first and second microbe activation device is water treated by the sewage treatment facility.

(30) The sewage treatment system as described in the section (29), wherein the sewage treatment facility further comprises a disinfection vessel configured to disinfect water from the final sedimentation pond, and wherein the water to be supplied to the first and second microbe activation device is water in the disinfection vessel before the disinfection.

(31) The sewage treatment system as described in any one of the sections (20) to (30), wherein the water from the first and second water feeding means contains nutrients required for germination of the spores.

(32) The sewage treatment system as described in any one of the sections (20) to (31), wherein the aerobic microbes include at least one selected from the group consisting of: Gram-positive bacteria belonging to the class Bacilli in the phylum Firmicutes; Gram-positive bacteria belonging to the class Actinobacteria in the phylum Actinobacteria; and Gram-positive bacteria in the phylum Chloroflexi, and optionally include yeasts.

(33) The sewage treatment system as described in any one of the sections (20) to (31), wherein the anaerobic and facultative anaerobic microbes include gut-dwelling Gram-negative sulfate-reducing bacteria in the phylum Proteobacteria, and/or are Gram-negative bacteria in the phylum Bacteroidetes.

In the sewage treatment system of the present invention, the microbial material production device is provided, wherein the dehydrated sludge including the surplus sludge from the initial sedimentation pond and/or the return sludge from the final sedimentation pond is treated by the microbial material production device, to produce the microbial material containing aerobic microbial spores, and the microbial material is supplied in its activated state to the sewage in the relay pump station. Thus, it becomes possible to improve bacterial conditions on a wall surface of a sewer conduit immediately downstream of the relay pump station, thereby preventing corrosion of the sewer conduit to extend the usable life of the sewer conduit.

In the sewage treatment system of the present invention, the microbial material production device is provided to enable microbes useful for sewage treatment to exist mainly in the form of spores, and the spores of the microbial material produced by the microbial material production are germinated by the microbe activation device, to establish a state in which Gram-positive bacteria belonging to the class Bacilli in the phylum Firmicutes and/or Gram-positive bacteria belonging to the class Actinobacteria in the phylum Actinobacteria and/or Gram-positive bacteria in the phylum Chloroflexi, which are microbes useful for decomposition of organic substances in the sewage, are richly contained in the sewage. As above, treatment in the biological treatment vessel can be conducted by activated sludge and the microbes from the microbe activation device, so that it is possible to significantly efficiently decompose and treat organic substances in sewage sludge.

Generally, a bacterial phase of the activated sludge most commonly consists of bacteria in the phylum Proteobacteria, the phylum Bacteroidetes or the like. In the sewage treatment system of the present invention, Gram-positive bacteria belonging to the class Bacilli in the phylum Firmicutes, Gram-positive bacteria belonging to the class Actinobacteria in the phylum Actinobacteria and Gram-positive bacteria in the phylum Chloroflexi exist richly in the microbial material (e.g., microbes in the microbial material comprise slightly more than 50% of bacteria in the class Actinobacteria, slightly more than 20% of bacteria in the phylum Firmicutes, and slightly more than 10% of bacteria in the phylum Chloroflexi). Thus, in the activated sludge of the biological treatment vessel, the number of the bacteria in the phylum Proteobacteria, the phylum Bacteroidetes or the like is reduced. Further, even if the biological treatment vessel is operated under the condition that the concentration of MLSS (mixed liquor suspended solid) rises to 2000 to 4000 g/L, the activated sludge exhibits a good sedimentation property, so that it is purified and treated under a stable reduction in BOD (biological oxygen demand). This was effective for all the conventional technical problems, i.e., (1) improvement to bulking problem, (2) improvement to nitrification and denitrification, (3) improvement to dephosphorization treatment, and (4) improvement to bubble release and scum in the final sedimentation pond.

DESCRIPTION OF EMBODIMENTS

Figure 1:
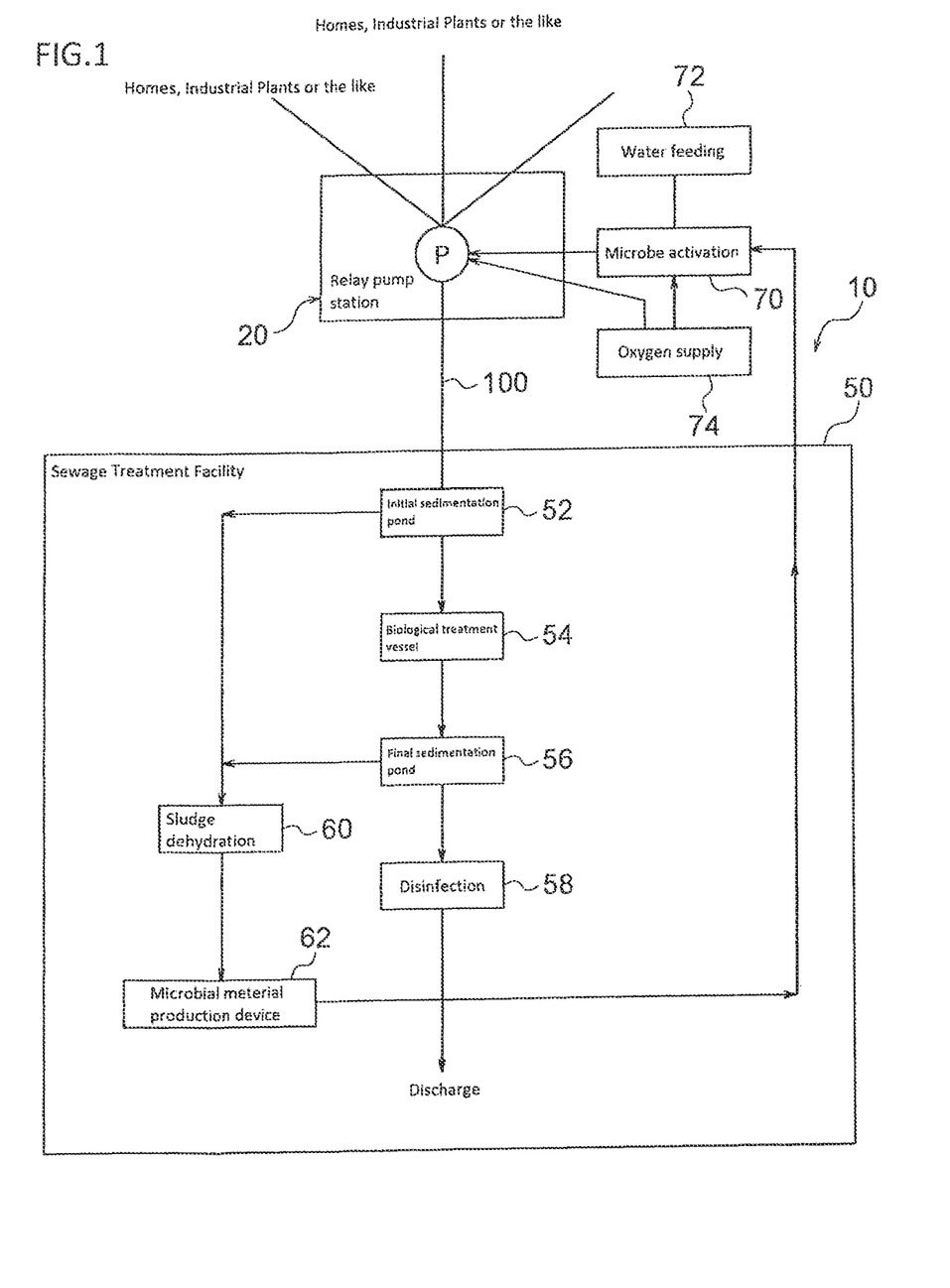
FIG. 1 is a conceptual diagram showing the configuration of a sewage treatment system according to a first embodiment of the present invention.

With reference to FIG. 1, a sewage treatment system 10 according to a first embodiment of the present invention will now be described.

The sewage treatment system 10 comprises a relay pump station 20 for sewage discharged from a sewage source including homes and/or industrial plants/companies, and a sewage treatment facility 50 configured to receive the sewage from the relay pump station 20 via a sewer conduit 100 and treat the received sewage. As with the conventional sewage treatment facility using the activated sludge method, the sewage treatment facility 50 comprises an initial sedimentation pond 52, a biological treatment vessel (aeration vessel) 54, a final sedimentation pond 56 and a disinfection vessel 58, which are arranged in this order along an upstream-to-downstream direction. The sewage is purified and disinfected through the sewage treatment facility 50, and discharged via a sewer conduit. The above configuration of the sewage treatment facility 50 is commonly used in this type of sewage treatment system, and therefore any further detailed description thereof will be omitted. Here, the relay pump station 20 is equipped with a pump P connected to a sewer conduit extending from the sewage source including homes and/or industrial plants/companies.

The sewage treatment system 10 further comprises a dehydration device 60 connected to the initial sedimentation pond 52 and the final sedimentation pond 56 and configured to receive surplus sludge from the initial sedimentation pond and return sludge from the final sedimentation pond and dehydrate the received surplus sludge and the received return sludge. Alternatively, this dehydration device 60 may be configured to receive one of the surplus sludge and the return sludge and dehydrate the received surplus or return sludge. The dehydration device 60 may be configured to perform any type of dehydration method, such as a centrifugal separation type, a filter press type or a machine concentration type. The dehydration device 60 is operable to dehydrate the surplus sludge and/or the return sludge to form dehydrated sludge having a moisture content of 65 to 85%.

The dehydration device 60 is connected to a microbial material production device 62. This microbial material production device 62 is configured to supply oxygen to the dehydrated sludge received from the dehydration device 60 while maintaining the temperature of the dehydrated sludge within the range of 60° C. to 110° C., to subject the dehydrated sludge to aerobic fermentation using Gram-positive aerobic microbes in the hydrated sludge. As a result of the aerobic fermentation, Gram-negative anaerobic and facultative anaerobic microbes in the hydrated sludge are decomposed and extinguished, and the aerobic microbes become endospores or spores due to consumption/depletion of water and nutrients in the dehydrated sludge through the aerobic fermentation. By utilizing this phenomenon, a microbial material is produced which contains the harmful Gram-negative anaerobic and facultative anaerobic microbes as little as possible, and contains the useful aerobic microbial spores. The microbial material production device 62 is equipped with a heater for the aforementioned temperature control, and, if needed, an oxygen (air) supply unit.

It should be noted here that, although there is a conventional technique (see JP 2001-271510A) in which a fermented product substantially equivalent to the microbial material in the present invention (for a fertilizer) is directly added to sewage sludge, an object thereof is to promote sedimentation of activated sludge, which is different from the object of the present invention. Further, from the conventional technique, it is conceivable to directly add the above fermented product into the biological treatment vessel. However, in the biological treatment vessel, there are many other microbes (Gram-negative bacteria, etc.) consuming nutrients at a higher priority, and thereby nutrients or the like required for germination of the spores deplete or run low, so that the spores directly added into the biological treatment vessel fail to germinate or need to take a long period of time for germination. Therefore, fulfillment of a sewage treating function of the useful microbes is considered to be limited.

The sewage treatment system 10 according to this embodiment further comprises a microbe activation device 70 provided in or connected to the relay pump station 20. This microbe activation device 70 is connected with water feeding means 72, which is understood to be a water feeding source (or source from which water is fed) configured to feed water from any part of the sewage treatment system to the microbe activation device 70, and oxygen supply means 74, which is understood to be an oxygen supply source (or a source from which oxygen is supplied) configured to feed oxygen to the microbe activation device 70. As the water to be supplied from the water feeding means 72, it is preferable to use sewage before being subjected to the sewage treatment (e.g., sewage upstream of the pump P of the relay pump station 20), or water after flowing out of the final sedimentation pond 56 and before entering the disinfection vessel 58. Such water contains nutrients required for germination of the spores, so that it is possible to simultaneously provide water and nutrients required for germination of the spores.

The oxygen to be supplied from the oxygen supply means 74 may be supplied in the form of air. In this case, it is not necessary to particularly provide an oxygen generator or an oxygen tank. Further, in a case where the oxygen concentration in sewage is considered to be sufficient for germination of the spores, air may be introduced into the sewage in the pump P or the sewage immediately after being discharged from the pump P.

The microbe activation device 70 is configured to receive the microbial material from the microbial material production device 62, and supply the water from the water feeding means 72 to the received microbial material, while maintaining the temperature and the oxygen concentration of the water, respectively, within the range of 10° C. to 40° C., and within the range of 1 to 10 mg/L, thereby germinating the spores of the microbial material to activate the microbial material. The microbe activation device 70 may be equipped with a cooling and heating unit for maintaining the water temperature within the above range. Further, in order to maintain the oxygen concentration within the above range, the microbe activation device 70 is configured to receive supply of oxygen (air) from the oxygen supply means 74. The oxygen (air) from the oxygen supply means 74 is also supplied to the sewage at any position of the relay pump station 20 to increase a dissolved oxygen amount in the sewage. Here, generally, it takes 5 minutes or more after a germination environment is established, to cause germination of the spores in the microbe activation device 70. Thus, it is preferable to put the microbial material into the sewage (e.g., sewage in the pump) after retaining the microbial material in the microbe activation device 70 for 5 minutes or more.

Based on the above configuration, in the sewage treatment system 10, the sewage flowing through the sewer conduit downstream of the relay pump station 20 is placed in a state in which sufficient oxygen is dissolved therein (the oxygen concentration thereof is increased), despite consumption of oxide by the germinated aerobic microbes and aerobic microbes originally existing in the sewage.

As a result of an increase in the oxygen concentration of the sewage, sulfate-reducing bacteria as anaerobic bacteria are deactivated to suppress production of hydrogen sulfide, so that it is possible to prevent production of sulfuric acid by suppression of the sulfuric acid-producing bacteria, and improve bacterial conditions in a biofilm on a wall surface of the sewer conduit extending from a position immediately downstream of the relay pump station, to achieve a good state in which there is no sulfuric acid-producing bacteria. This makes it possible to prevent generation of sulfuric acid and thus prevent corrosion of the sewer conduit to extend the usable life of the sewer conduit, and to purify the sewage itself by activity of the aerobic microbes to reduce a burden on a subsequent facility.

Figure 2:
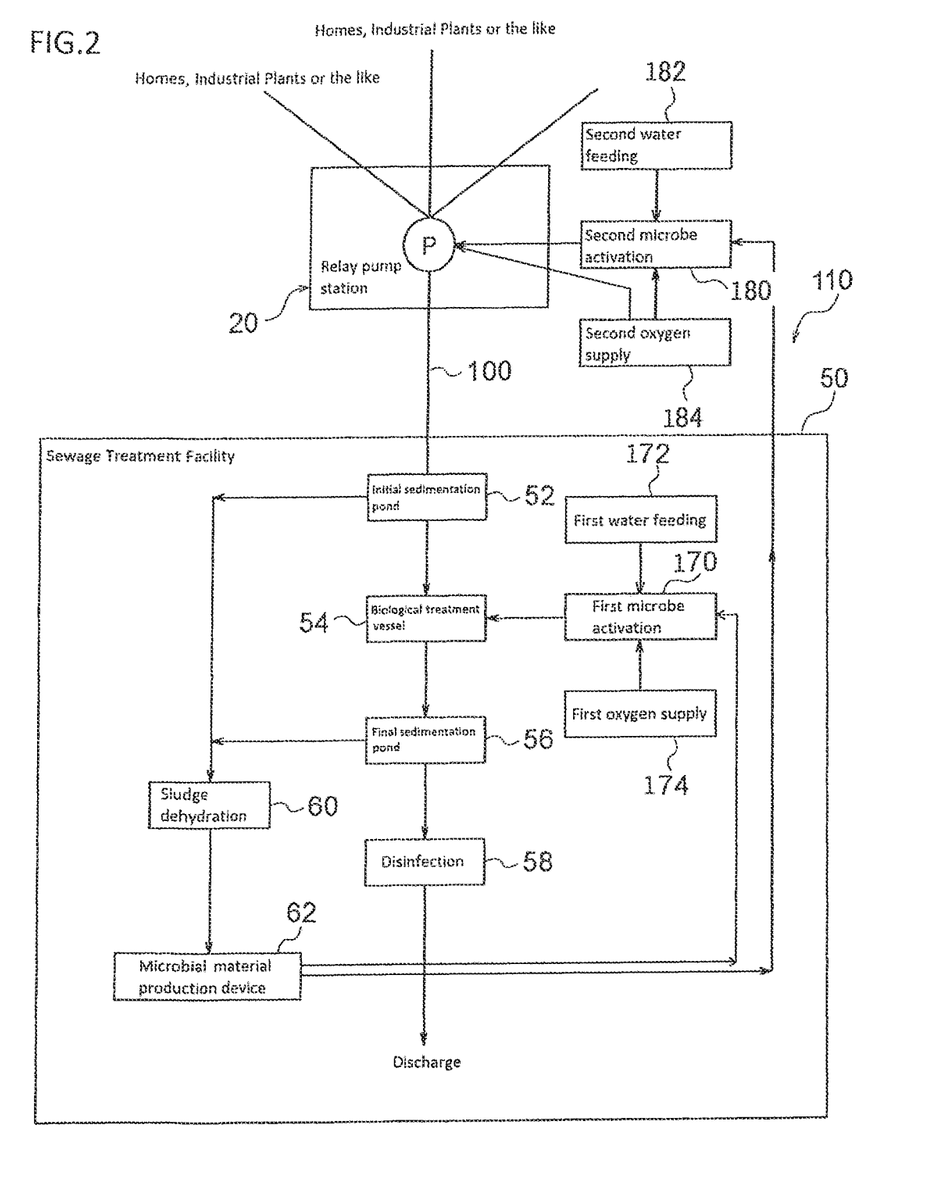
FIG. 2 is a conceptual diagram showing the configuration of a sewage treatment system according to a second embodiment of the present invention.

Next, with reference to FIG. 2, a sewage treatment system 110 according to a second embodiment of the present invention will be described. Description about the same element or component in the first embodiment described with reference to FIG. 12 will be omitted.

The sewage treatment system 110 comprises a first microbe activation device 170 provided in or connected to the sewage treatment facility 50. This first microbe activation device 170 is connected with first water feeding means 172, which is understood to be a water feeding source configured to feed water from any part of the sewage treatment system to the first microbe activation device 170. The first microbe activation device 170 is connected with the first oxygen supply means 174 configured to feed oxygen to the first microbe activation device 170, when needed. As the water to be supplied from the water feeding means 172, it is preferable to use sewage before being subjected to the sewage treatment (e.g., sewage upstream of the pump P of the relay pump station 20), or water after flowing out of the final sedimentation pond 56 and before entering the disinfection vessel 58. Such water contains nutrients required for germination of the spores, so that it is possible to simultaneously provide water and nutrients required for germination of the spores.

In a case where a dissolved oxygen amount in the water from the first water feeding means 172 is insufficient, oxygen is supplied from the first oxygen supply means 174. The oxygen to be supplied from the first oxygen supply means 174 may be supplied in the form of air. In this case, it is not necessary to particularly provide an oxygen generator or an oxygen tank.

The first microbe activation device 170 is configured to receive the microbial material from the microbial material production device 62, and supply the water from the water feeding means 172 to the received microbial material, while maintaining the temperature and the oxygen concentration of the water, respectively, within the range of 15° C. to 40° C., and within the range of 1 to 10 mg/L, thereby germinating the spores of the microbial material to activate the microbial material. The first microbe activation device 170 may be equipped with a cooling and heating unit for maintaining the water temperature within the above range. Further, in order to maintain the oxygen concentration within the above range, the first microbe activation device 170 is configured to receive supply of oxygen (air) from the first oxygen supply means 174. Here, it takes 5 minutes or more after a germination environment is established, to cause germination of the spores in the first microbe activation device 170. Thus, it is preferable to put the microbial material into the biological treatment vessel 54 after retaining, for 5 minutes or more, the microbial material in the microbe activation device 70 which contains Gram-negative bacteria conflicting with the microbial material, as little as possible.

Based on the above configuration, in the sewage treatment system 110, (aerobic) microbes as a result of germination of the spores in the microbial material from the microbial material production device 62 are additionally supplied to normal activated sludge in the biological treatment vessel 54 to efficiently decompose organic substances of the sewage in cooperation with useful microbes in the activated sludge.

In the first embodiment, for example, the aerobic microbes may include Gram-positive bacteria belonging to the class Bacilli in the phylum Firmicutes, and/or Gram-positive bacteria belonging to the class Actinobacteria in the phylum Actinobacteria, and optionally further include yeasts.

On the other hand, the anaerobic and facultative anaerobic microbes may include gut-dwelling Gram-negative sulfate-reducing bacteria in the phylum Proteobacteria, and/or Gram-negative bacteria in the phylum Bacteroidetes.

The sewage treatment system 110 further comprises a second microbe activation device 180 provided in or connected to the relay pump station 20. This microbe activation device 180 is connected with second water feeding means 182, which is understood to be a water feeding source configured to feed water from any part of the sewage treatment system to the second microbe activation device 180, and second oxygen supply means 184 configured to feed oxygen to the second microbe activation device 180. As the water to be supplied from the second water feeding means 182, it is preferable to use sewage before being subjected to the sewage treatment (e.g., sewage upstream of the pump P of the relay pump station 20), or water after flowing out of the final sedimentation pond 56 and before entering the disinfection vessel 58. Such water contains nutrients required for germination of the spores, so that it is possible to simultaneously provide water and nutrients required for germination of the spores.

The oxygen to be supplied from the second oxygen supply means 184 may be supplied in the form of air, as with the first oxygen supply means 174. In this case, it is not necessary to particularly provide an oxygen generator or an oxygen tank. Further, in a case where the oxygen concentration in sewage is considered to be sufficient for germination of the spores, air may be introduced into the sewage in the pump P or the sewage immediately after being discharged from the pump P.

As with the first microbe activation device 170, the second microbe activation device 180 is configured to receive the microbial material from the microbial material production device 62, and supply the water from the second water feeding means 182 to the received microbial material, while maintaining the temperature and the oxygen concentration of the water, respectively, within the range of 15° C. to 40° C., and within the range of 1 to 10 mg/L, thereby germinating the spores of the microbial material to activate the microbial material. The microbe activation device 70 may be equipped with a cooling and heating unit for maintaining the water temperature within the above range. Further, in order to maintain the oxygen concentration within the above range, the second microbe activation device 180 is configured to receive supply of oxygen (air) from the second oxygen supply means 184. The oxygen (air) from the second oxygen supply means 184 is also supplied to the sewage at any position of the relay pump station 20 to increase a dissolved oxygen amount in the sewage. Here, generally, it takes 5 minutes or more after a germination environment is established, to cause germination of the spores in the second microbe activation device 180. Thus, it is preferable to put the microbial material into the sewage (e.g., sewage in the pump) after retaining the microbial material in the second microbe activation device 180 for 5 minutes or more, as described in connection with the first microbe activation device 170.

Based on the above configuration, in the sewage treatment system 110, the sewage flowing through the sewer conduit downstream of the relay pump station 20 is placed in a state in which sufficient oxygen is dissolved therein (the oxygen concentration thereof is increased), despite consumption of oxide by the germinated aerobic microbes and aerobic microbes originally existing in the sewage.

As a result of an increase in the oxygen concentration of the sewage, sulfate-reducing bacteria as anaerobic bacteria are deactivated to suppress production of hydrogen sulfide, so that it is possible to prevent production of sulfuric acid by suppression of the sulfuric acid-producing bacteria, and improve bacterial conditions in a biofilm on a wall surface of the sewer conduit extending from a position immediately downstream of the relay pump station, to achieve a good state. This makes it possible to prevent generation of sulfuric acid and thus prevent corrosion of the sewer conduit to extend the usable life of the sewer conduit, and to purify the sewage itself by activity of the aerobic microbes to reduce a burden on a subsequent facility.

In the second embodiment, for example, the aerobic microbes may include Gram-positive bacteria belonging to the class Bacilli in the phylum Firmicutes, and/or Gram-positive bacteria belonging to the class Actinobacteria in the phylum Actinobacteria, and Gram-positive bacteria in the phylum Chloroflexi, and optionally include yeasts.

On the other hand, the anaerobic and facultative anaerobic microbes may include gut-dwelling Gram-negative sulfate-reducing bacteria in the phylum Proteobacteria, and/or Gram-negative bacteria in the phylum Bacteroidetes.

LIST OF REFERENCE SIGNS

10: sewage treatment system
20: relay pump station
50: sewage treatment facility
52: initial sedimentation pond
54: biological treatment vessel
56: final sedimentation pond
58: disinfection vessel
60: dehydration device
62: microbial material production device
70: microbe activation device
72: water feeding means 74: oxygen supply means
100: sewer conduit
170: first microbe activation device
172: first water feeding means
174: first oxygen supply means
180: second microbe activation device
182: second water feeding means
184: second oxygen supply means
P: pump

The invention claimed is:

1. A sewage treatment system comprising:
a relay pump station for sewage discharged from a sewage source
a sewage treatment facility configured to receive the sewage from the relay pump station via sewer conduits and treat the received sewage, wherein the sewage treatment facility comprises an initial sedimentation pond, a biological treatment vessel and a final sedimentation pond, which are arranged in this order along an upstream-to-downstream direction;
dehydration means connected to one or both the initial sedimentation pond and the final sedimentation pond and configured to receive surplus sludge from the initial sedimentation pond or return sludge from the final sedimentation pond, and dehydrate the received surplus sludge and/or the received return sludge;
a microbial material production device configured to supply oxygen to the dehydrated sludge received from the dehydration means while maintaining a temperature of the dehydrated sludge within the range of 60° C. to 110° C., to subject the dehydrated sludge to aerobic fermentation using Gram-positive aerobic microbes in the dehydrated sludge, thereby producing a microbial material in which anaerobic and facultative anaerobic microbes in the dehydrated sludge are decomposed and extinguished, and which contains decomposed organic matter and spores of Gram-positive aerobic bacteria belonging to the class Bacilli in the phylum Firmicutes, spores of Gram-positive aerobic bacteria belonging to the class Actinobacteria in the phylum Actinobacteria, and Gram-negative aerobic bacteria belonging to the class Chloroflexia in the phylum Chloroflexi, and optionally, yeasts;
a water feeding source configured to feed water from any part of the sewage treatment system to the after-mentioned microbe activation device;
a microbe activation device configured to receive the microbial material from the microbial material production device, and supply the water from the water feeding source to the received microbial material, while maintaining a temperature and an oxygen concentration of the water, respectively, within the range of 10° C. to 40° C., and within the range of 1 to 10 mg/L, thereby germinating the spores of the microbial material to activate the microbial material; and
an oxygen supply source configured to supply oxygen to the sewage at any position of the relay pump station;
wherein the sewage including the activated microbial material and the oxygen supplied from the oxygen supply source is sent from the relay pump station to the sewage treatment facility.

2. The sewage treatment system as recited in claim 1, wherein the water from the water feeding source is water treated by the sewage treatment facility, or if the sewage treatment facility comprises a disinfection vessel configured to disinfect water from the final sedimentation pond, is water before disinfection by the disinfection vessel, or is water from sewage upstream of a pump of the relay pump station.

3. The sewage treatment system as recited in claim 1, wherein the oxygen supply source is configured to supply oxygen to the sewage in a pump of the relay pump station.

4. The sewage treatment system as recited in claim 1, wherein the water from the water feeding source contains nutrients required for germination of the spores.

5. A sewage treatment system comprising:
a relay pump station for sewage discharged from a sewage source
a sewage treatment facility configured to receive the sewage from the relay pump station via a sewer conduit and treat the received sewage, wherein the sewage treatment facility comprises a biological treatment vessel and a final sedimentation pond which are arranged in this order along an upstream-to-downstream direction, and optionally further comprises an initial sedimentation pond disposed upstream of the biological treatment vessel;
dehydration means connected to the final sedimentation pond and optionally the initial sedimentation pond, and configured to receive return sludge from the final sedimentation pond and optionally surplus sludge from the initial sedimentation pond, and dehydrate the received return sludge and optionally the received surplus sludge;
a microbial material production device configured to supply oxygen to the dehydrated sludge received from the dehydration means while maintaining a temperature of the dehydrated sludge within the range of 60° C. to 110° C., to subject the dehydrated sludge to aerobic fermentation using Gram-positive aerobic microbes in the dehydrated sludge, thereby producing a microbial material in which Gram-negative anaerobic and facultative anaerobic microbes are decomposed and extinguished and which contains spores of Gram-positive aerobic bacteria belonging to the class Bacilli in the phylum Firmicutes, spores of Gram-positive aerobic bacteria belonging to the class Actinobacteria in the phylum Actinobacteria, and Gram-negative aerobic bacteria belonging to the class Chloroflexia in the phylum Chloroflexi, and optionally including yeasts;
a first water feeding source configured to feed water from any part of the sewage treatment system to the after-mentioned first microbe activation device;
a first oxygen supply source configured to supply oxygen to the after-mentioned first microbe activation device;
a first microbe activation device configured to: receive the microbial material from the microbial material production device; receive supply of the oxygen from the first oxygen supply source and supply of the water from the first water feeding source, while maintaining a temperature and an oxygen concentration of the water, respectively, within the range of 10° C. to 40° C., and within the range of 1 to 10 mg/L, thereby germinating the spores of the microbial material to activate the microbial material; and supply the activated microbial material to the biological treatment vessel;
a second water feeding source configured to feed water from any part of the sewage treatment system to the after-mentioned second microbe activation device;
a second oxygen supply source configured to supply oxygen to the after-mentioned second microbe activation device;
a second microbe activation device configured to: receive the microbial material from the microbial material production device; receive supply of the oxygen from the second oxygen supply source and supply of the water from the second water feeding source, while maintaining a temperature and an oxygen concentration of the water, respectively, within the range of 10° C. to 40° C., and within the range of 1 to 10 mg/L, thereby germinating the spores of the microbial material to activate the microbial material; and supply the activated microbial material to the relay pump station.

6. The sewage treatment system as recited in claim 5, wherein, when the sewage treatment facility comprises the initial sedimentation pond, the water to be supplied to the first and second microbe activation device is water overflow from the initial sedimentation pond, is water from the sewage before entering the initial sedimentation pond, is water treated by the sewage treatment facility, or, if the sewage treatment facility comprises a disinfection vessel configured to disinfect water from the final sedimentation pond, is water before the disinfection by the disinfection vessel.

7. The sewage treatment system as recited in claim 5, wherein the water from the first and second water feeding sources contains nutrients required for germination of the spores.

8. A sewage treatment system comprising:
- a relay pump station for sewage discharged from a sewage source
- a sewage treatment facility configured to receive the sewage from the relay pump station via sewer conduits and treat the received sewage, wherein the sewage treatment facility comprises a biological treatment vessel and a final sedimentation pond which are arranged in this order along an upstream-to-downstream direction, and optionally further comprises an initial sedimentation pond disposed upstream of the biological treatment vessel;
- dehydration means connected to the final sedimentation pond and optionally the initial sedimentation pond, and configured to receive return sludge from the final sedimentation pond and optionally surplus sludge from the initial sedimentation pond, and dehydrate the received return sludge and optionally the received surplus sludge;
- a microbial material production device configured to supply oxygen to the dehydrated sludge received from the dehydration means while maintaining a temperature of the dehydrated sludge within the range of 60° C. to 110° C., to subject the dehydrated sludge to aerobic fermentation using Gram-positive aerobic microbes in the dehydrated sludge, thereby producing a microbial material in which anaerobic and facultative anaerobic microbes in the dehydrated sludge are decomposed and extinguished, and which contains decomposed organic matter and spores of Gram-positive aerobic bacteria belonging to the class Bacilli in the phylum Firmicutes, spores of Gram-positive aerobic bacteria belonging to the class Actinobacteria in the phylum Actinobacteria, and Gram-negative aerobic bacteria belonging to the class Chloroflexia in the phylum Chloroflexi, and optionally, yeasts;
- a first water feeding source configured to feed water from any part of the sewage treatment system to the after-mentioned first microbe activation device;
- a first oxygen supply source configured to supply oxygen to the after-mentioned first microbe activation device;
- a first microbe activation device configured to: receive the microbial material from the microbial material production device; receive supply of the oxygen from the first oxygen supply source and supply of the water from the first water feeding source, while maintaining a temperature and an oxygen concentration of the water, respectively, within the range of 10° C. to 40° C., and within the range of 1 to 10 mg/L, thereby germinating the spores of the microbial material to activate the microbial material; and supply the activated microbial material to the biological treatment vessel;
- a second water feeding source configured to feed water from any part of the sewage treatment system to the after-mentioned second microbe activation device;
- a second oxygen supply source configured to supply oxygen to the after-mentioned second microbe activation device;
- a second microbe activation device configured to: receive the microbial material from the microbial material production device; supply the water from the second water feeding source to the microbial material while maintaining a temperature and an oxygen concentration of the water, respectively, within the range of 10° C. to 40° C., and within the range of 1 to 10 mg/L, thereby germinating the spores of the microbial material to activate the microbial material; and supply the activated microbial material to the relay pump station.

9. The sewage treatment system as recited in claim 8, wherein a temperature of the water from the first and second water feeding sources is maintained within the range of 15° C. to 40° C.

10. The sewage treatment system as recited in claim 8, wherein the oxygen from the first and second oxygen supply sources is supplied in the form of air.

11. The sewage treatment system as recited in claim 8, wherein the sewage treatment facility comprises the initial sedimentation pond, and wherein the water to be supplied to the first and second microbe activation devices is water overflow from the initial sedimentation pond, is water from the sewage before entering the initial sedimentation pond, is water treated by the sewage treatment facility, if the sewage treatment facility comprises a disinfection vessel configured to disinfect water from the final sedimentation pond, is water before the disinfection by the disinfection vessel.

12. The sewage treatment system as recited in claim 8, wherein the water from the first and second water feeding sources contains nutrients required for germination of the spores.

\* \* \* \* \*